(12) United States Patent
Herr

(10) Patent No.: US 9,121,478 B2
(45) Date of Patent: *Sep. 1, 2015

(54) HAND-HELD TOOL DEVICE

(71) Applicant: Tobias Herr, Stuttgart (DE)

(72) Inventor: Tobias Herr, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 81 days.

This patent is subject to a terminal disclaimer.

(21) Appl. No.: 13/727,054

(22) Filed: Dec. 26, 2012

(65) Prior Publication Data

US 2013/0184116 A1    Jul. 18, 2013

(30) Foreign Application Priority Data

Dec. 27, 2011   (DE) .................. 10 2011 089 921

(51) Int. Cl.
| | |
|---|---|
| *F16H 1/46* | (2006.01) |
| *B25D 16/00* | (2006.01) |
| *B25D 11/08* | (2006.01) |
| *B25D 11/02* | (2006.01) |

(52) U.S. Cl.
CPC ... *F16H 1/46* (2013.01); *B25D 11/02* (2013.01); *B25D 11/08* (2013.01); *B25D 16/003* (2013.01); *B25D 16/006* (2013.01); *B25D 2216/0015* (2013.01); *B25D 2216/0023* (2013.01); *B25D 2216/0038* (2013.01); *B25D 2216/0084* (2013.01); *B25D 2250/165* (2013.01); *B25D 2250/255* (2013.01)

(58) Field of Classification Search
USPC ................. 475/269, 275, 296, 317, 330
See application file for complete search history.

(56) References Cited

U.S. PATENT DOCUMENTS

| | | | | |
|---|---|---|---|---|
| 6,142,242 | A * | 11/2000 | Okumura et al. ............... | 173/48 |
| 2004/0245005 | A1* | 12/2004 | Toyama et al. ................. | 173/48 |
| 2008/0167158 | A1* | 7/2008 | Chen ............................. | 475/298 |
| 2008/0308286 | A1* | 12/2008 | Puzio ............................ | 173/210 |
| 2012/0322605 | A1* | 12/2012 | Hirabayashi .................. | 475/149 |
| 2013/0161042 | A1* | 6/2013 | Blum et al. .................... | 173/48 |
| 2013/0165291 | A1* | 6/2013 | Blum et al. .................... | 475/269 |

FOREIGN PATENT DOCUMENTS

| | | |
|---|---|---|
| DE | 10 2009 027 440 | 1/2011 |
| EP | 1 857 228 | 11/2007 |

* cited by examiner

*Primary Examiner* — Justin Holmes
(74) *Attorney, Agent, or Firm* — Kenyon & Kenyon LLP

(57) ABSTRACT

A hand-held tool device includes: a tool spindle; a striking mechanism; and a planetary transmission having at least one first planetary transmission stage which drives the striking mechanism, a second planetary transmission stage which drives the tool spindle, and a striking mechanism shut-off clutch.

9 Claims, 11 Drawing Sheets

HAND-HELD TOOL DEVICE

BACKGROUND OF THE INVENTION

Field of the Invention

The present invention relates to a hand-held tool device which has a tool spindle, a striking mechanism and a planetary transmission, that has at least one first planetary transmission stage which drives the striking mechanism, and a second planetary transmission stage, which drives at least one tool spindle.

BRIEF SUMMARY OF THE INVENTION

The present invention provides a hand-held tool device, having a tool spindle, a striking mechanism and a planetary transmission, that has at least one first planetary transmission stage, which drives the striking mechanism, and a second planetary transmission stage, which drives at least one tool spindle.

It is provided that the planetary transmission has a striking mechanism shut-off clutch. By "tool spindle" one should particularly understand a shaft which transfers a rotational motion from the planetary transmission to a tool chuck of the hand-held tool device. The tool spindle is preferably developed as a solid shaft. Alternatively, the tool spindle could be developed as a hollow shaft. By "striking mechanism" one should particularly understand a device which is provided to generate impact loading and particularly to output it in the direction of an insertable tool. The striking mechanism preferably conducts the impact loading, at least in a percussion drilling operation, advantageously via the tool spindle and/or particularly via the tool chuck on to the insertable tool. The striking mechanism is preferably provided to transfer a rotational motion into a particularly translatory striking motion. "Provided" is to be understood in particular as specially designed and/or equipped. A "planetary transmission" is particularly a transmission having at least one planetary transmission stage. The planetary transmission preferably has only planetary transmission stages. By "planetary transmission stage" one should understand particularly a transmission stage which has at least one planet pinion, that is connected to a planet carrier, the former being coupled via an internal geared wheel in the outward radial direction and to a sun wheel in the inward radial direction. By "drive" one should particularly understand in this connection that the planetary transmission transfers mechanical energy to the striking mechanism for generating striking and to form a rotational motion of the tool chuck to the tool spindle. By "striking mechanism shut-off clutch" one should particularly understand a clutch particularly of a striking mechanism shut-off device which, in at least one operating state, at least prevents and/or advantageously interrupts a drive of the striking mechanism The striking mechanism shut-off clutch preferably interrupts the drive of the striking mechanism when an operator ends a percussion drilling procedure, that is, in particular, that he removes the rotating insertable tool from a workpiece. By the expression that "the planetary transmission has a striking mechanism shut-off clutch" it should particularly be understood, in this connection that the striking mechanism shut-off clutch includes a clutch element which is connected at least torsionally fixed, preferably directly to a component of a planetary transmission stage of the planetary transmission, namely in particular to an internal geared wheel, to a sun wheel and/or to a planet carrier. By "clutch element" one should particularly understand a first element provided to produce a detachable, torsionally fixed connection with a second element, in a state ready for operation. By the design, according to the present invention, of the hand-held tool device, a particularly small, light and efficient striking mechanism is able to be provided, in which the insertable tool is actuated in a striking manner only during a percussion drilling operation.

In a further design, it is provided that the striking mechanism shut-off clutch is situated between the first planetary transmission stage and the second planetary transmission stage, whereby an especially short insertion length may be reached in a constructively simple manner. By the term "situated between two planetary transmission stages" one should understand that a first clutch element of the striking mechanism shut-off clutch is connected torsionally fixed to a component of the first planetary transmission stage of the planetary transmission and a second clutch element of the striking mechanism shut-off clutch is connected torsionally fixed to a component of the second planetary transmission stage of the planetary transmission.

Furthermore, it is provided that the second planetary transmission stage drives the first planetary transmission stage in at least one operating state, whereby an especially effective drilling operation is made possible in response to a compact design.

It is further provided that the striking mechanism shut-off clutch has a clutch element that is supported to be axially displaceable, whereby a constructively simple design is made possible. By "supported to be axially displaceable", one should particularly understand that the clutch element is movably fastened relative to a second clutch element, particularly along a rotational axis of the clutch element.

In addition, it is provided that the tool spindle transfers an axial clutching force to the striking mechanism shut-off clutch, in at least one operating state, whereby a constructively simple design is able to be achieved. By the term "transmit an axial clutching force" should particularly be understood to mean that the tool spindle transfers a force, in at least one operating state which opens the striking mechanism shut-off clutch and/or advantageously closes it. The tool spindle is preferably supported axially movable for the transfer of the clutching motion.

Furthermore, it is provided that the striking mechanism shut-off clutch has a clutch element that is connected torsionally fixed to a planet carrier of the first planetary transmission stage, whereby an advantageous transmission ratio is able to be achieved. This clutch element is preferably the axially displaceably supported clutch element already described. By "connected torsionally fixed" one should understand particularly that the clutch element and the planet carrier are coupled relative to each other immovably about a rotational axis. The clutch element and the planet carrier are advantageously connected with form-locking. The clutch element and the planet carrier are particularly advantageously developed at least partially as one piece. By "at least partially as one piece" one should particularly understand in one continuous material, such as by a welding process and/or an adhesion process, etc., and particularly advantageously connected in an attached form, such as by production by casting and/or production in a monocomponent or multicomponent injection molding method. By "planet carrier" one should particularly understand a component of a planetary transmission stage, that guides a planet pinion rotatably on a circular path.

In one advantageous development of the present invention, it is provided that the striking mechanism shut-off clutch has a clutch element which is connected torsionally fixed to a planet carrier of the second planetary transmission stage, whereby an advantageous transmission ratio is made possible in a constructively simple manner.

Moreover, it is provided that the planet carrier of the second planetary transmission stage is developed in at least two parts, whereby low wear and high efficiency are able to be achieved. By the term "developed in two parts" one should particularly understand that the planet carrier has a first part and a second part, which are separated from each other at least by one possibly very narrow gap. In particular, the two parts of the planet carrier are not connected in a manner having continuous material. Advantageously, the two parts of the planet carrier are movable with respect to each other, especially in the axial direction.

It is further provided that the planet carrier of the second planetary transmission stage is connected torsionally fixed to the tool spindle, whereby an advantageous transmission ratio is able to be attained.

In addition, it is provided that the first planetary transmission stage is provided to increase the rotational speed of the second planetary transmission stage for driving the striking mechanism, whereby a particularly effective percussion drilling operation is made possible in a small design. By the term "increase a rotational speed" one should particularly understand that the first planetary transmission stage translates a first rotational speed into a higher second rotational speed in an effective direction in which it transfers mechanical energy. The first planetary transmission stage translates a rotational speed, at which the tool chuck is being driven, into a higher rotational speed, at which a striking mechanism spindle is being driven.

It is furthermore provided that the planetary transmission rotatably supports the tool spindle particularly on the side facing away from the tool chuck, whereby a particularly stable support of the tool spindle may be attained, especially by two support points that are at a far distance from each other. By "support rotatably" one should particularly understand that the planetary transmission, in at least one operating state, effects a supporting force on the tool spindle that is perpendicular to a rotational axis of the tool spindle. Furthermore, the striking mechanism spindle advantageously supports the tool spindle rotatably.

In addition, the present invention is based on a hand-held tool having a hand-held tool device according to the present invention. The hand-held tool is preferably provided to actuate the insertable tool in a screw mode, in a drilling mode, in a screw drilling mode and particularly in a chisel mode.

DETAILED DESCRIPTION OF THE INVENTION

Figure 1:
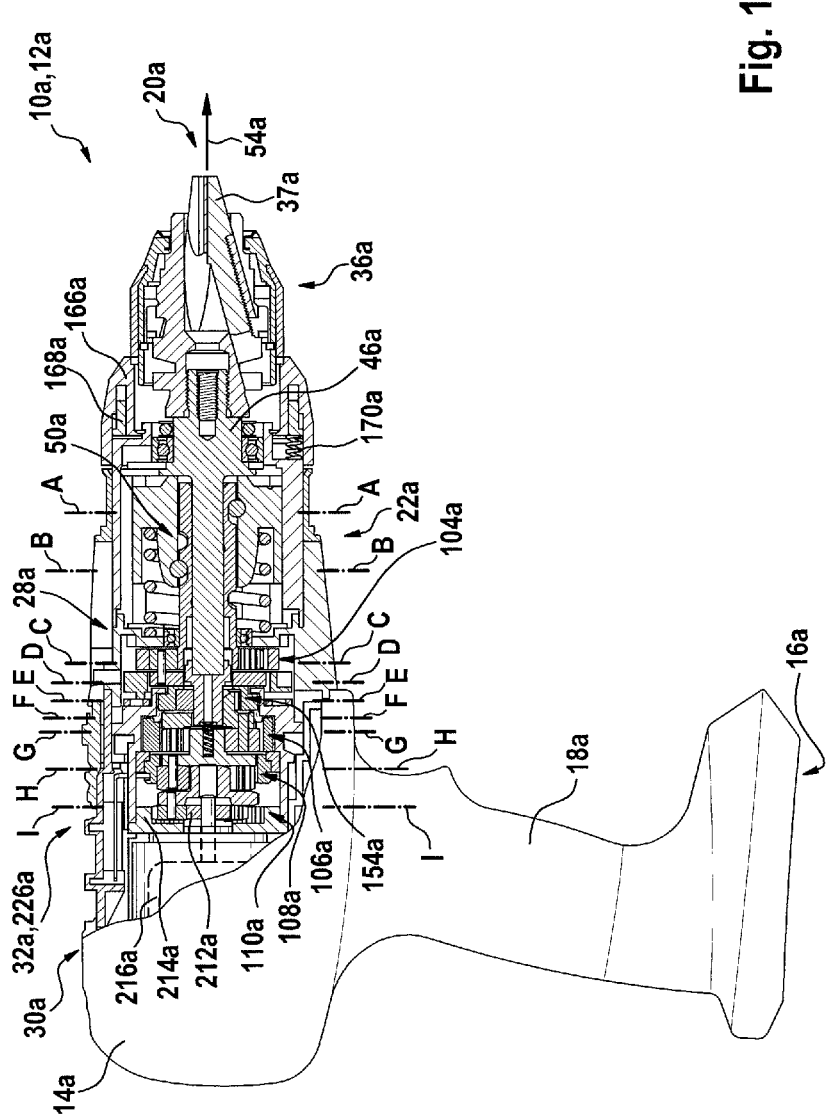
FIG. 1 shows a section of a hand-held tool having a hand-held tool device according to the present invention.

FIG. 1 shows a hand-held tool 10a. Hand-held tool 10a is developed as a percussion drilling screw machine. Hand-held tool 10a has a hand-held tool device 12a according to the present invention, and hand-held tool housing 14a and a battery interface 16a. Battery interface 16a is provided to supply hand-held tool device 12a with electric power from a hand-held tool battery not shown here in greater detail. Hand-held tool housing 14a is developed in the shape of a pistol. Hand-held tool housing 14a is developed to have many parts. It includes a hand grip 18a, by which an operator holds hand-held tool 10a during a working process. Hand-held tool device 12a includes a tool guide unit 20a, a striking mechanism 22a, a first striking mechanism shut-off device 24a, a second striking mechanism shut-off device 26a, a planetary transmission 28a, a drive unit 30a, an operating device 32a and a torque limitation unit 34a.

Tool guide unit 20a includes a tool chuck 36a and a tool spindle 38a. During a working process, tool chuck 36a fastens an insertable tool not shown here, such as a drill or a screw bit. Tool chuck 36a fastens the insertable tool in a force-locking manner. Tool chuck 36a has three clamping jaws that an operator is able to fasten movably, which fasten the insertable tool during a working process. In addition, tool chuck 36a fastens the insertable tool during a working process in a manner that is axially immovable with respect to tool chuck 36a and particularly with respect to tool spindle 38a. One part of tool chuck 36a and tool spindle 38a are connected to each other relatively immovably. In this case, tool chuck 36a and tool spindle 38a are screwed together. Hand-held tool device 12a has a bearing means 40a, which supports tool spindle 38a on a side facing tool chuck 36a. Bearing means 40a supports tool spindle 38a in an axially displaceable manner. Bearing means 40a is connected axially fixed to tool spindle 38a. Bearing means 40a is supported axially movable to hand-held tool housing 14a. Hand-held tool device 12a has an additional bearing means 41a, which supports tool spindle 38a on a side facing planetary transmission 28a. Bearing means 41a is developed as a roller bearing, in this case as a needle bearing, whereby a support having little play is made possible. Bearing means 41a supports tool spindle 38a in an axially displaceable manner. A striking mechanism spindle 46a encloses bearing means 41a. Bearing means 41a is functionally situated between tool spindle 38a and striking mechanism spindle 46a.

Tool spindle 38a includes a striking surface 42a, which a beater 44a of the striking mechanism 22a beats during a percussion drilling operation. Beater 44a has a mass that is maximally two-thirds the size of the mass of tool guide unit 20a. In this case, the mass of beater 44a is less than one-half as great as the mass of tool guide unit 20a. The mass of beater 44a amounts to about 45% of the mass of tool guide unit 20a.

Figure 2:
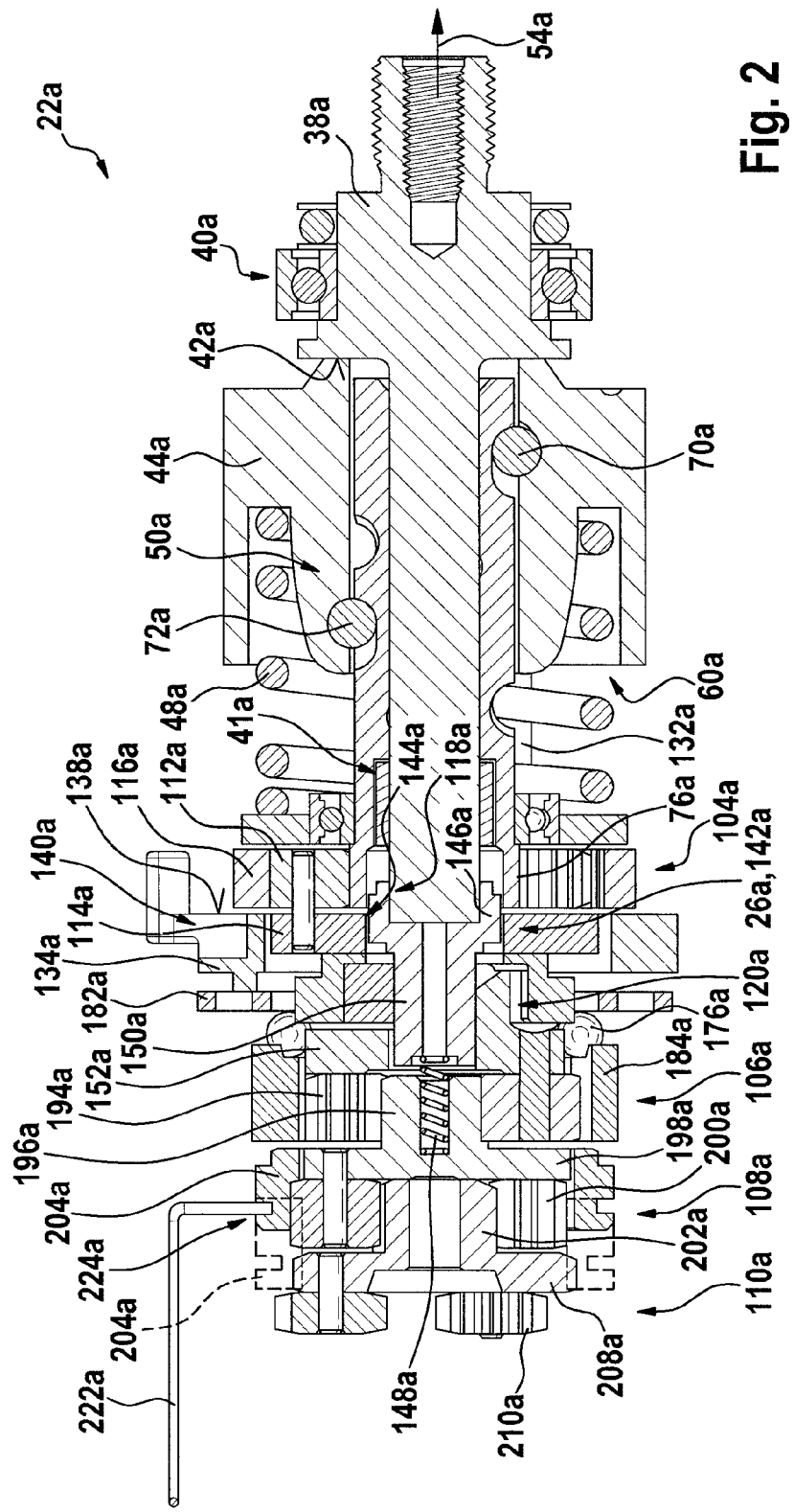
FIG. 2 shows a partially left open section through a striking mechanism and a planetary transmission of the hand-held tool device of FIG. 1.

In FIG. 2, striking mechanism 22a and planetary transmission 28a are shown in greater detail. Striking mechanism 22a has beater 44a, striking mechanism spindle 46a, a striking mechanism spring 48a, a striking mechanism driving device 50a and a beater guide 52a. Beater 44a is supported translatorially movable in striking direction 54a. Striking direction 54a is aligned parallel to an axial direction of striking mechanism spindle 46a.

Figure 3:
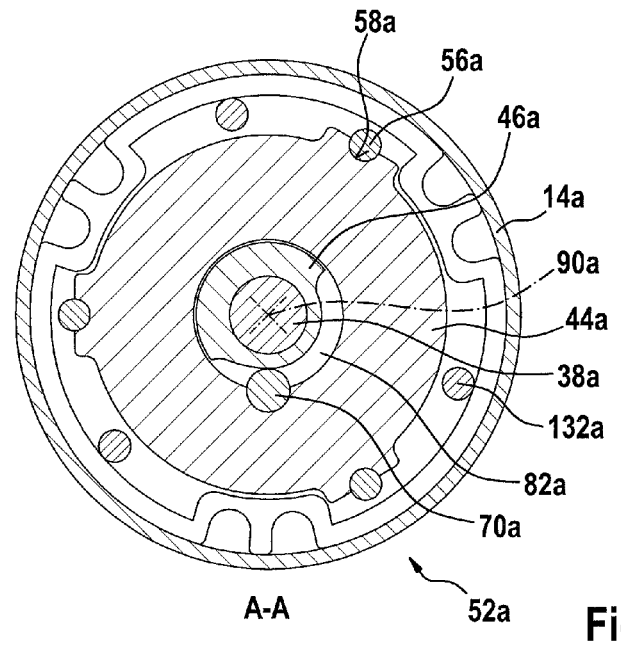
FIG. 3 shows a first sectional area A of the striking mechanism of the hand-held tool device of FIG. 1.
Figure 4:
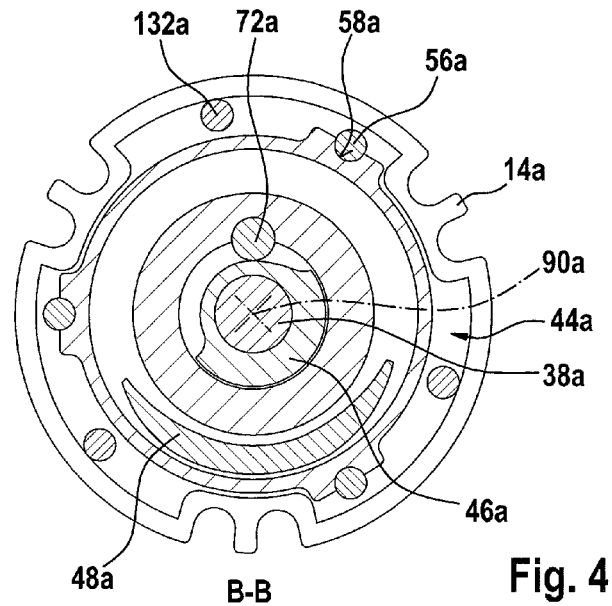
FIG. 4 shows a second sectional area B of the striking mechanism of the hand-held tool device of FIG. 1.

FIGS. 3 and 4 show a sectional area A and a sectional area B of striking mechanism 22a. Beater guide 52a supports beater 44a torsionally fixed with respect to hand-held tool housing 14a. Beater guide 52a has three guide rods 56a on which beater 44a slides. Guide rods 56a are situated regularly around beater 44a. Beater 44a has sliding surfaces 58a, which enclose guide rods 56a in a plane perpendicular to striking direction 54a over 180 degrees. Beater 44a encloses striking mechanism spindle 46a in a plane aligned perpendicular to striking direction 54a, over 360 degrees. In addition, beater 44a encloses tool spindle 38a on the plane over 360 degrees. Moreover, striking mechanism spindle 46a encloses on the plane tool spindle 38a over 360 degrees. Striking mechanism spindle 46a is situated coaxially with tool spindle 38a.

Figure 5:
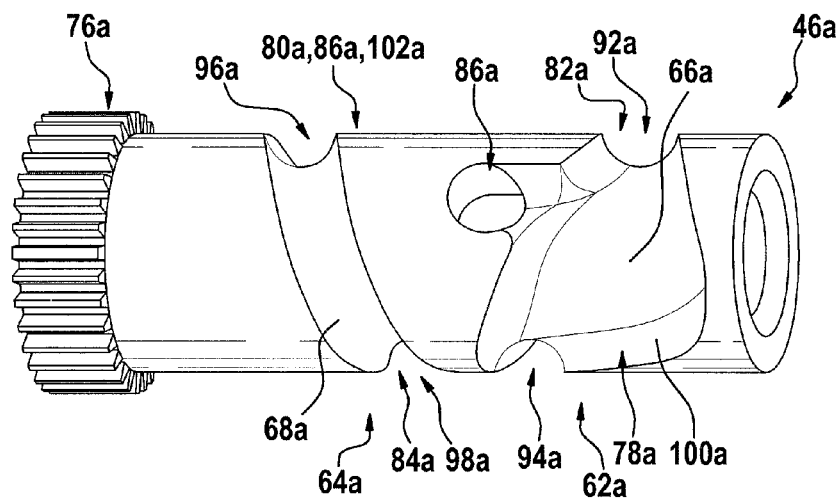
FIG. 5 shows a perspective representation of a striking mechanism spindle of the striking mechanism of the hand-held tool device of FIG. 1.
Figure 6:
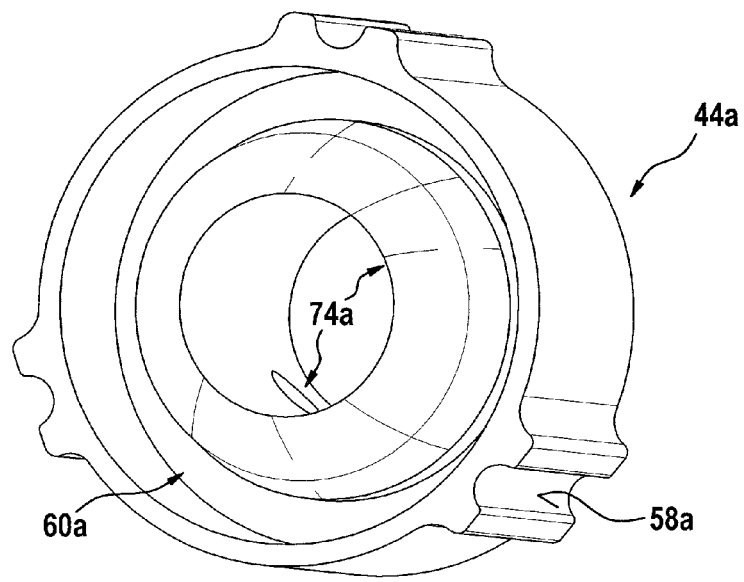
FIG. 6 shows a perspective representation of a beater of the striking mechanism of the hand-held tool device of FIG. 1.

Striking mechanism spring 48a accelerates beater 44a before a strike in striking direction 54a. For this purpose, hand-held tool housing 14a supports striking mechanism spring 48a on a side facing away from beater 44a. Striking mechanism spring 48a presses directly against beater 44a. Beater 44a has a spring fastening 60a. Spring fastening 60a is developed as an annular depression. FIG. 5 shows striking mechanism spindle 46a in a perspective view. FIG. 6 shows beater 44a in a perspective view. Beater driving device 50a has a first curve guide 62a and a second first curve guide 64a. Curve guides 62a, 64a each include a guiding curve 66a, 68a and connecting means 70a, 72a. Connecting means 70a, 72a are developed to be ball-shaped. Beater 44a supports connecting means 70a, 72a in place with respect to beater 44a. Beater 44a has hemisphere-shaped fastening recesses 74a. Connecting means 70a, 72a slide in guiding curves 66a, 68a during a percussion drilling operation. Striking mechanism spindle 46a has a part of curve guides 62a, 64a, namely, guiding curve 66a, 68a. Striking mechanism spindle 46a borders a space in which connecting means 70a, 72a move during a percussion drilling operation. Striking mechanism spindle 46a is developed as a hollow shaft. Planetary transmission 28a drives striking mechanism spindle 46a. For this purpose, striking mechanism spindle 46a has a toothing 76a on the side facing away from tool chuck 36a. Guiding curves 66a, 68a each have an impact-free running region 78a, 80a, an impact wind-up region 82a, 84a and an assembly recess 86a, 88a. During assembly, connecting means 70a, 72a are inserted through assembly recesses 86a, 88a into fastening recesses 74a of beater 44a. In a percussion drilling operation, striking mechanism spindle 46a rotates clockwise as seen in striking direction 54a. Impact wind-up regions 82a, 84a are developed to be spiral-shaped. They extend over 180 degrees about a rotational axis 90a of striking mechanism spindle 46a. Impact wind-up regions 82a, 84a move connecting means 70a, 72a, and with that, beater 44a counter to striking direction 54a in the percussion drilling operation. Consequently, striking mechanism 22a has connecting means 70a, 72a which, in at least one operating state, transfer a motion from striking mechanism spindle 46a to beater 44a.

Impact-free running regions 78a, 80a each connect two ends 92a, 94a, 96a, 98a of impact wind-up regions 82a, 84a. Impact-free running regions 78a, 80a extend over 180 degrees about a rotational axis 90a of striking mechanism spindle 46a. Impact-free running regions 78a, 80a each have an impact side 100a, 102a which, starting from an end 94a, 96a of impact wind-up region 82a, facing planetary transmission 28a, runs approximately parallel to striking direction 54a. After the connecting means 70a, 72a penetrate impact-free running regions 78a, 80a, striking mechanism spring 48a accelerates beater 44a and connecting means 70a, 72a in striking direction 54a. In this context, connecting means 70a, 72a move through impact-free running regions 78a, 80a, without experiencing an axial force, until beater 44a hits striking surface 42a. Curve guides 62a, 64a are situated about rotational axis 90a, offset by 180 degrees. Curve guides 62a, 64a are situated one behind the other in the axial direction.

Figure 7:
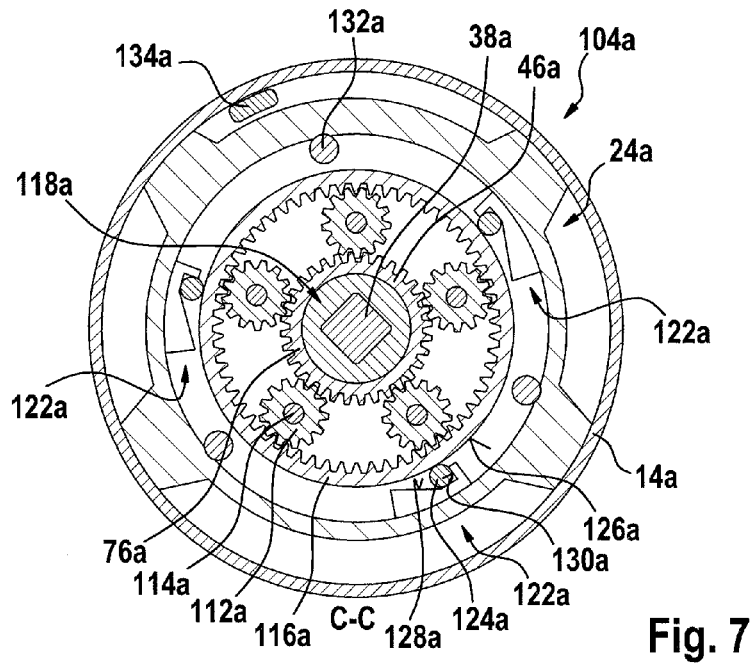
FIG. 7 shows a sectional area C of a first planetary transmission stage and of a first striking mechanism shut-off device of the hand-held tool device of FIG. 1.

Planetary transmission 28a has first planetary transmission stage 104a, a second planetary transmission stage 106a, a third planetary transmission stage 108a and a fourth planetary transmission stage 110a FIG. 7 shows a sectional area C of first planetary transmission stage 104a. Planetary transmission stages 104a, 106a, 108a, 110a shown in FIGS. 7, 12, 13 and 15 have toothed wheels having a number of teeth that appears meaningful to one skilled in the art. The toothed wheels of planetary transmission stages 104a, 106a, 108a, 110a engage with one another, which, in this case, is partially not shown like that. First planetary transmission stage 104a increases a first rotational speed of second planetary transmission stage 106a for driving striking mechanism 22a. Second planetary transmission stage 106a drives tool spindle 38a at this first rotational speed. Toothing 76a of striking mechanism spindle 46a forms a sunwheel of first planetary transmission stage 104a. Toothing 76a meshes with planet pinions 112a of first planetary transmission stage 104a, which are guided by a planet carrier 114a of first planetary transmission stage 104a. An internal geared wheel 116a of first planetary transmission stage 104a meshes with planet pinions 112a of first planetary transmission stage 104a.

During a percussion drilling operation, first striking mechanism shut-off device 24a fixes internal geared wheel 116a of first planetary transmission stage 104a immovable with respect to hand-held tool housing 14a. First striking mechanism shut-off device 24a is provided to switch on beater driving device 50a in response to a first right-hand drilling rotation direction, and to switch off automatically beater driving device 50a in response to a second, left-hand drilling rotation direction. First striking mechanism shut-off device 24a acts on internal geared wheel 116a of first planetary transmission stage 104a. First striking mechanism shut-off device 24a blocks internal geared wheel 116a of first planetary transmission stage 104a at the first right-hand drilling rotation direction. First striking mechanism shut-off device 24a releases internal geared wheel 116a of first planetary transmission stage 104a in response to second, left-hand drilling rotation direction, so that it is able to rotate. For this purpose, striking mechanism shut-off device 24a has three clamping mechanisms 122a. Clamping mechanisms 122a each include a blocking means 124a, a first clamping surface 126a, a second clamping surface 128a and free-wheeling surfaces 130a. Sealing means 124a is developed as a roller. First clamping surface 126a forms an area, lying outside, of a surface of internal geared wheel 116a of first planetary transmission stage 104a. Second clamping surface 128a is situated immovable with respect to hand-held tool housing 14a. During an operation in the first, right-hand drilling rotation direction, blocking means 124a clamp between first clamping surfaces 126a and second clamping surface 128a. During an operation in the second, left-hand drilling rotation direction, free-wheeling areas 130a guide blocking means 124a and prevent clamping.

Furthermore, FIG. 7 shows connecting means 118a, which connects tool spindle 38a and a planet carrier 120a of the second planetary transmission stage 106a in a torsionally fixed manner. Connecting means 118a connects tool spindle 38a and planet carrier 120a of second planetary transmission stage 106a in an axially displaceable manner, in this case.

Figure 8:
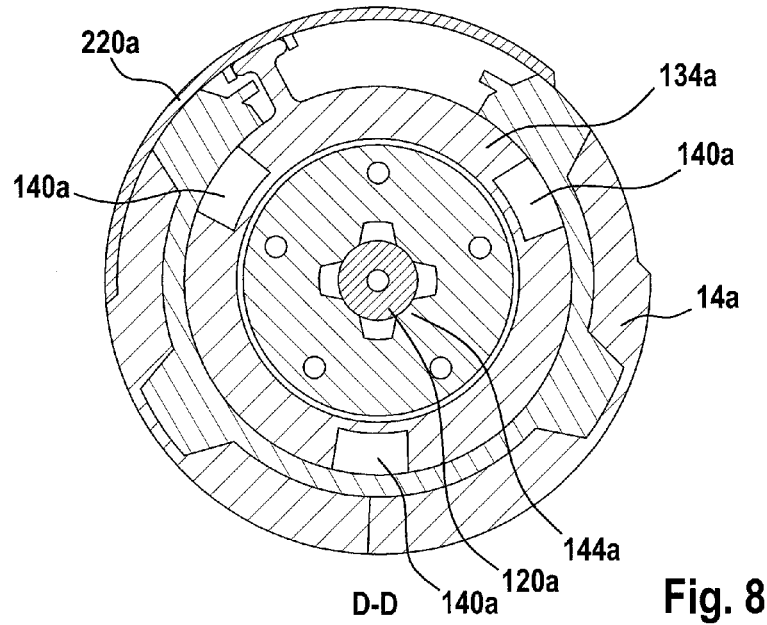
FIG. 8 shows a sectional area D of a control element and a second striking mechanism shut-off device of the hand-held tool device of FIG. 1.
Figure 9:
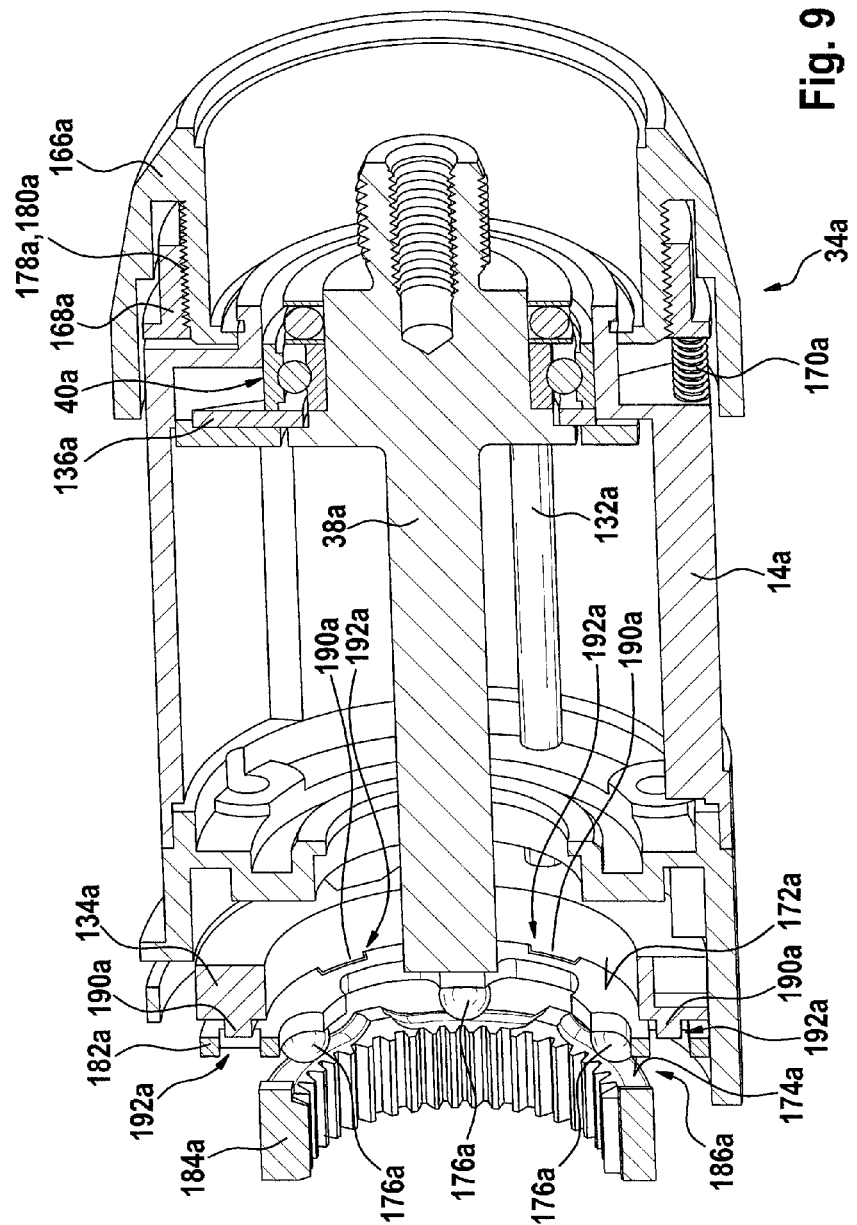
FIG. 9 shows a perspective sectional representation of a part of the hand-held tool device of FIG. 1.

Moreover, FIGS. 3, 4 and 7 show three first transfer means 132a of second striking mechanism shut-off device 26a. Transfer means 132a are implemented as rods. FIG. 8 shows a sectional area D through a control element 134a of hand-held tool device 12a. FIG. 9 shows second striking mechanism shut-off device 26a in a perspective sectional representation. Control element 134a supports tool guide unit 20a in a screw mode shown in FIGS. 1, 8 and 9 and in a drilling mode in a direction counter to striking direction 54a. A force applied to tool guide unit 20a acts via bearing means 40a, a second transfer means 136a of second striking mechanism shut-off device 26a and first transfer means 132a on support areas 138a of control element 134a. Control element 134a has three recesses 140a. In a percussion drilling operation shown in FIG. 2, first transfer means 132a are able to be inserted into recesses 140a, whereby tool guide unit 20a is axially movable.

Second striking mechanism shut-off device 26a has a striking mechanism shut-off clutch 142a. Striking mechanism shut-off clutch 142a is partially developed as one piece with planetary transmission 28a. Striking mechanism shut-off clutch 142a is situated between first planetary transmission stage 104a and second planetary transmission stage 106a. Striking mechanism shut-off clutch 142a has a first clutch 144a which is connected torsionally fixed to a planet carrier 114a of first planetary transmission stage 104a. Striking mechanism shut-off clutch 142a has a second clutch element 146a which is connected torsionally fixed to a planet carrier 120a of first planetary transmission stage 106a. In the screw mode and the drilling mode shown, striking mechanism shut-off clutch 142a is opened. In a percussion drilling operation, tool spindle 38a transfers an axial clutching force to striking mechanism shut-off clutch 142a when the operator presses an insertable tool against a workpiece. The clutching force closes striking mechanism shut-off clutch 142a. In FIG. 2, striking mechanism shut-off clutch 142a is shown closed. When the operator of the insertable tool removes it from the workpiece, a striking mechanism switching spring 148a of hand-held tool device 12a opens striking mechanism shut-off clutch 142a.

Planet carrier 120a of second planetary transmission stage 106a is developed as two parts. A first part 150a of planet carrier 120a of second planetary transmission stage 106a is connected torsionally fixed to tool spindle 38a. First part 150a of planet carrier 120a is connected to tool spindle 38a in an axially displaceable manner, whereby planet carrier 120a remains torsionally coupled to tool spindle 38a even during a striking maneuver. Thus, first part 150a is permanently connected to tool spindle 38a. First part 150a of planet carrier 120a is supported dispaceably against striking mechanism switching spring 148a. A second part 152a of planet carrier 120a of second planetary transmission stage 106a is connected torsionally fixed to first part 150a of planet carrier 120a. First part 150a and second part 152a of planet carrier 120a are connected to each other in an axially displaceable manner. First part 150a and second part 152a of planet carrier 120a are connected permanently in a torsionally fixed manner.

Figure 10:
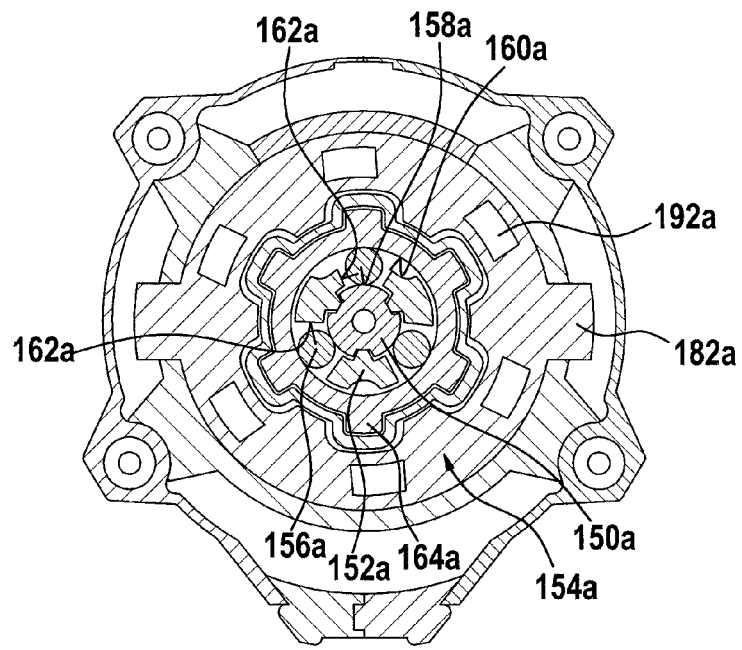
FIG. 10 shows a sectional area E of a spindle blocking device of the hand-held tool device of FIG. 1.
Figure 11:
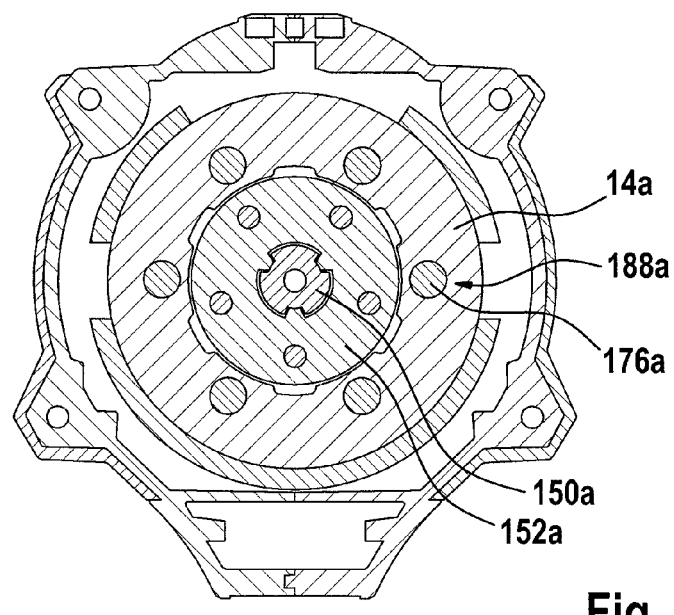
FIG. 11 shows a sectional area F through blocking means of a spindle blocking device of the hand-held tool device of FIG. 1.

FIG. 10 shows a sectional area of a spindle blocking device 154a of hand-held tool device 12a. Spindle blocking device 154a is provided to connect tool spindle 38a to hand-held tool housing 14a in a torsionally fixed manner, when a tool torque is applied to tool chuck 36a, for instance, during the clamping of an insertable tool into tool chuck 36a. Spindle blocking device 154a is partially developed as one piece with planet carrier 120a of second planetary transmission stage 106a. Spindle blocking device 154a has blocking means 156a, first clamping surfaces 158a, a second clamping surface 160a and free-wheeling surfaces 162a. Blocking means 156a are developed in a roller-shaped manner. First clamping surfaces 158a are developed as areas of a surface of first part 150a of planet carrier 120a of second planetary transmission stage 106a. First clamping surfaces 158a are developed to be flat. Second clamping surface 164a is developed as the inner side of a clamping ring 164a of spindle blocking device 154a. Clamping ring 164a is connected torsionally fixed to hand-held tool housing 14a. Free-wheeling surfaces 162a are developed as areas of a surface of first part 152a of planet carrier 120a of second planetary transmission stage 106a. When a tool torque is applied to tool chuck 36a, blocking means 156a clamp between first clamping surfaces 158a and second clamping surface 160a. When drive unit 30a is driving, free-wheeling surfaces 162a guide blocking means 156a on a circular path and prevent clamping. First part 150a and second part 152a of planet carrier 120a are geared to each other, having play. FIGS. 1, 2, 9 and 10 shows torque limitation unit 34a. Torque limitation unit 34a is provided to limit the tool torque that is maximally output by tool chuck 36a in a screw mode. Torque limitation unit 34a includes an operating unit 166a, an adjusting element 168a, limitation strings 170a, transfer means not shown in greater detail, first impact surfaces 172a, a second impact surface 174a and limitation means 176a. Operating element 166a is developed to be ring-shaped. It follows tool chuck 36a, in the direction of planetary transmission 28a. Operating element 166a has a setting screw thread 178a, which is matched to a setting screw thread 180a of adjusting element 168a. Adjusting element 168a is supported torsionally fixed and axially displaceable. A rotation of operating element 166a displaces adjusting element 168a in the axial direction. Limiting springs 170a are supported on one side on adjusting element 168a. Limiting springs 170a are supported on another side via the transfer means to impact means 182a of torque limitation unit 34a. A surface of impact means 182a has first impact surface 172a. In screw mode, impact means 182a is displaceably supported in the axial direction by limiting springs 170a. Second impact surface 174a is developed as an area of the surface of an internal geared wheel 184a of second planetary transmission stage 106a. Second striking surface 174a has trough-shaped depressions 186a. Limiting means 176a are developed in a ball-shaped manner. Limiting means 176a are supported displaceably in tube-shaped recesses 188*a* in impact direction 54*a*. FIG. 11 shows a sectional area F of torque limitation unit 34*a*. During a screw process, limitation means 176*a* are situated in the trough-shaped recessions 186*a*. Limitation means 176*a* fasten internal geared wheel 184*a* of second planetary transmission stage 106*a*. When the maximum tool torque, that is set, has been reached, limitation means 176*a* press away impact means 182*a* against limiting springs 170*a*. Then, limitation means 176*a* each jump in the next one of the trough-shaped depressions 186*a*. In the process, internal geared wheel 194*a* of second planetary transmission stage 106*a* is turning, whereby the screw process is interrupted.

Control element 134*a* of hand-held tool device 12*a* has supporting means 190*a*, which, at least during a drilling operation, prevent an axial motion of impact means 182*a*. For this purpose, supporting means 190*a* support impact means 182*a* in the axial direction. Impact means 182*a* has screw recesses 192*a*, into which impact means 182*a* dip in response to reaching the maximum tool torque, particularly in a screw operation as shown in FIG. 9. Supporting means 190*a* are situated accordingly during a screw setting of control element 134*a*. In the case of a percussion drilling operation, support means 190*a* each also prevent an axial motion of impact means 182*a* and, with that, a response of torque limitation unit 34*a*. As an alternative, impact means could also be situated, during a percussion drilling operation, so that they are able to dip into screw recesses. Thus, a torque limitation unit would be active in the percussion drilling operation.

Figure 12:
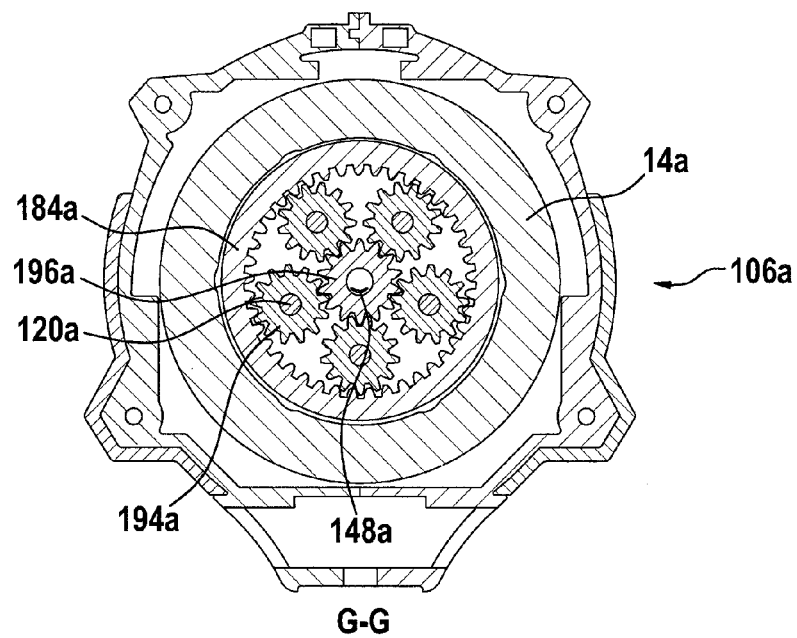
FIG. 12 shows a sectional area G of a second planetary transmission stage of the hand-held tool device of FIG. 1.

FIG. 12 shows a sectional area G of second planetary transmission stage 106*a*. At least during a drilling operation, internal geared wheel 184*a* of second planetary transmission stage 106*a* is supported, protected from a complete revolution, in hand-held tool housing 14*a*. Planet pinions 194*a* of second planetary transmission stage 106*a* mesh with internal geared wheel 184*a* and a sun wheel 196*a* of second planetary transmission stage 106*a*.

Figure 13:
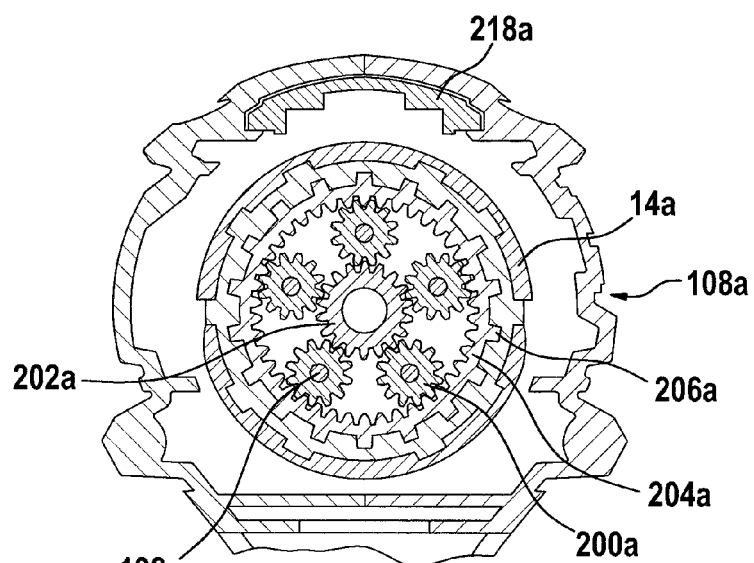
FIG. 13 shows a sectional area H of a third planetary transmission stage of the hand-held tool device of FIG. 1.

FIG. 13 shows a sectional area H of third planetary transmission stage 108*a*. Sun wheel 196*a* of second planetary transmission stage 106*a* is connected torsionally fixed to a planet carrier 198*a* of third planetary transmission stage 108*a*. Planet pinions 200*a* of third planetary transmission stage 108*a* mesh with a sun wheel 202*a* and an internal geared wheel 204*a* of third planetary transmission stage 108*a*. Internal geared wheel 204*a* of third planetary transmission stage 108*a* has a gearing 206*a* which connects internal geared wheel 204*a* of third planetary transmission stage 108*a* torsionally fixed to hand-held tool housing 14*a*, in a first transmission ratio.

Figure 14:
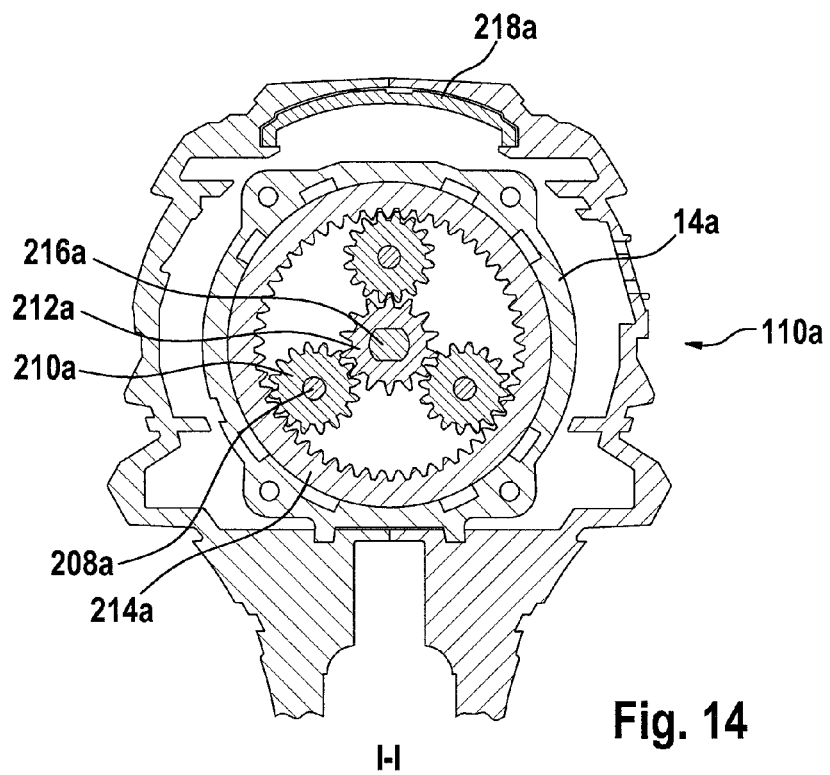
FIG. 14 shows a sectional area I of a fourth planetary transmission stage of the hand-held tool device of FIG. 1.

FIG. 14 shows a sectional area I of third planetary transmission stage 108*a*. Sun wheel 202*a* of third planetary transmission stage 108*a* is connected torsionally fixed to a planet carrier 208*a* of fourth planetary transmission stage 110*a*. Planet pinions 210*a* of fourth planetary transmission stage 110*a* mesh with a sun wheel 212*a* and an internal geared wheel 214*a* of fourth planetary transmission stage 110*a*. Internal geared wheel 214*a* is connected torsionally fixed to hand-held tool housing 14*a*. Sun wheel 212*a* of fourth planetary transmission stage 110*a* is connected torsionally fixed to a rotor 216*a* of drive unit 30*a*.

Internal geared wheel 204*a* of third planetary transmission stage 108*a* is supported displaceably in the axial direction, as shown in FIG. 2. In the first transmission ratio, internal geared wheel 204*a* of third planetary transmission stage 108 is connected torsionally fixed to hand-held tool housing 14*a*. In the second transmission, internal geared wheel 204*a* of third planetary transmission stage 108*a* is connected displaceably to planet carrier 208*a* of fourth planetary transmission stage 110*a*, and supported rotatably with respect to hand-held tool housing 14*a*. Consequently, there comes about a step-down ratio of the first transmission between rotor 216*a* of drive unit 30*a* and planet carrier 198*a* of third planetary transmission stage 108*a* which is greater than a step-down ratio of the second transmission.

Operating device 32*a* has a first operating element 218*a* and a second operating element 220*a*. First operating element 218*a* is situated on the side of hand-held tool housing 14*a* that faces away from handle 18*a*. It is supported movably parallel to the axial direction of planetary transmission 28*a*. First operating element 218*a* is connected via adjusting means 222*a* of operating device 32*a* to internal geared wheel 204*a* of third planetary transmission stage 108*a* in the axial direction. Internal geared wheel 204*a* of third planetary transmission stage 108*a* has a groove 224*a* in which adjusting means 222*a* engages. Thus, internal geared wheel 204*a* of third planetary transmission stage 108*a* is connected to adjusting means 222*a* in the axial direction, axially rotatable with respect to adjusting means 222*a*. Adjusting means 222*a* is developed to be springy, whereby the transmission from a rotary position of internal geared wheel 204*a* of third planetary transmission stage 108*a* is able to be adjusted independently. When first operating element 218*a* is pushed in the direction of tool chuck 36*a*, this sets the first transmission. When second operating element 220*a* is pushed away from tool chuck 36*a*, this sets the second transmission.

Second operating element 220*a* is situated on the side of hand-held tool housing 14*a* that faces away from handle 18*a*. Second operating element 220*a* is situated displaceable about an axis which is aligned parallel to the axial direction of planetary transmission 28*a*. Second operating element 220*a* is connected torsionally fixed to control element 134*a* of hand-held tool device 12*a*. Using second operating element 220*a*, one is able to set the screw mode, the drilling mode and the percussion drilling mode. When second operating element 220*a* is pushed to the left, as seen in striking direction 54*a*, this sets the percussion drilling mode. When second operating element 220*a* is pushed to the right, as seen in striking direction 54*a*, this sets the screw mode. When second operating element 220*a* is pushed to the middle, as seen in striking direction 54*a*, this sets the drilling mode.

Figure 15:
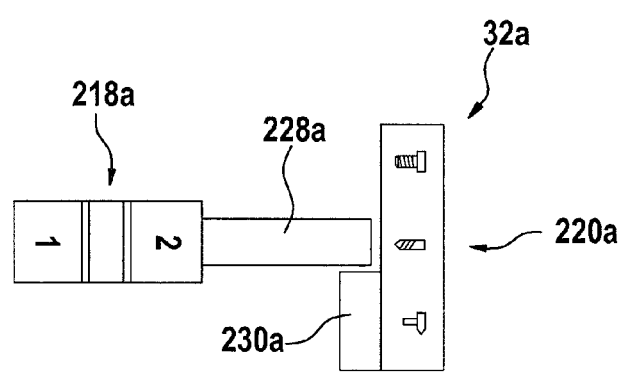
FIG. 15 shows a schematic representation of an operating device and a protective device of the hand-held tool device of FIG. 1.

FIG. 15 schematically shows a protective device 226*a* of hand-held tool device 12*a*, which prevents an operation in the first transmission in the percussion drilling operation. In FIG. 15, the first transmission and the drilling mode are set. Protective device 226*a* is partially developed as one piece with operating device 32*a*. First operating element 218*a* has first blocking means 228*a* of protective device 226*a* connected to it in an attached form. Second operating element 220*a* has second blocking means 230*a* of protective device 226*a* connected to it in an attached form. Blocking means 228*a* are each developed tongue-shaped. First blocking means 228*a* extends in the direction of second operating element 220*a*. Second blocking means 230*a* extends in the direction of first operating element 218*a*. Protective device 226*a* prevents switching over into the percussion drilling operation when the first transmission is set. Protective device 226*a* prevents switching over into the first transmission when the percussion drilling operation is set.

Drive unit 30*a* is developed as an electric motor. Drive unit 30*a* has a maximum torque which causes a maximum tool torque in the first transmission of more than 15 Nm, and in the second transmission of less than 15 Nm. The maximum tool torque in the first transmission amounts to 30 Nm. The maximum tool torque in the second transmission amounts to 10

Nm. In this context, the tool torque should be determined according to Standard DIN EN 60745.

Striking mechanism switching spring 148a of hand-held tool device 12a, in the case of a percussion drilling operation, opens striking mechanism shut-off clutch 142a when the operator removes the insertable tool from the workpiece. Striking mechanism switching spring 148a is situated coaxially to planetary transmission stages 104a, 106a, 108a, 110a of planetary transmission 28a. Second planetary transmission stage 106a and third planetary transmission stage 108a enclose striking mechanism switching spring 148a in each case in at least one plane, which is aligned perpendicular to the axial direction of planetary transmission 28a. Second planetary transmission stage 106a and third planetary transmission stage 108a are each situated effectively between at least two additional planetary transmission stages 104a, 106a, 108a, 110a of planetary transmission 28a. Planet carrier 120a of second planetary transmission stage 106a supports striking mechanism switching spring 148a on the side facing away from tool chuck 36a.

FIGS. 16 through 19 show additional exemplary embodiments of the present invention. The following descriptions and the drawings are limited essentially to the differences between the exemplary embodiments. Regarding components that are designated in the same way, particularly regarding components having identical reference numerals, it is fundamentally possible to refer also to the drawings and/or the description of the other exemplary embodiments, especially of FIGS. 1 through 15. In order to distinguish the exemplary embodiments, the letter a is added after the reference numerals of the exemplary embodiment in FIGS. 1 through 15. In the exemplary embodiments of FIGS. 16 through 19, the letter a is replaced by the letter b or by the letters b through e.

Figure 16:
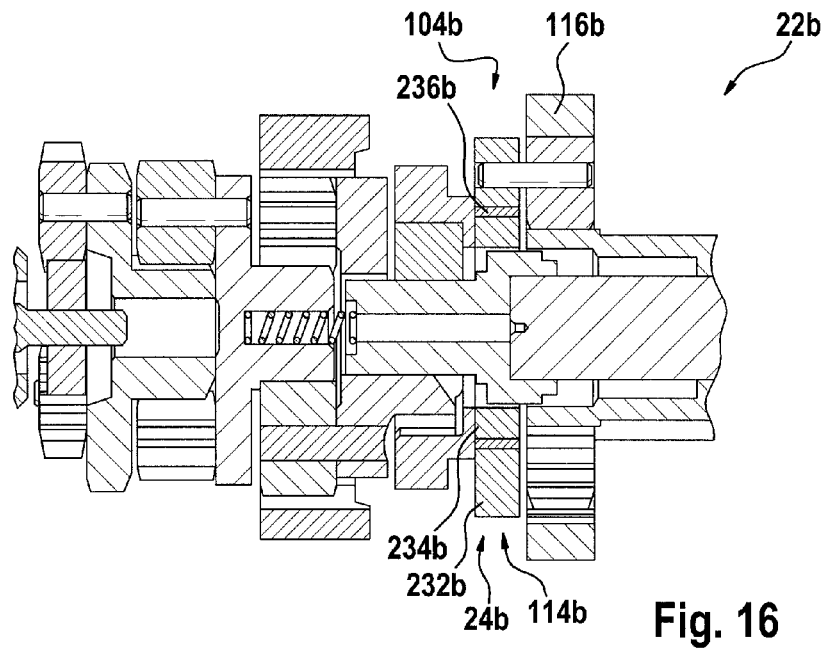
FIG. 16 shows an alternative exemplary embodiment of a first striking mechanism shut-off device of a hand-held tool device according to the present invention.

FIG. 16 shows schematically an additional, alternative exemplary embodiment of a first striking mechanism shut-off device 24b. A planet carrier 114b of a first planetary transmission stage 104b is developed in two parts. A first part 232b of the planet carrier 114b guides planet pinions 112b of first planetary transmission stage stage 104b. A second part 234b of planet carrier 114b is torsionally coupled to a second planetary transmission stage 106b. A first striking mechanism shut-off device 24b of a striking mechanism 22b has a freewheel 236b that appears meaningful to one skilled in the art, which connects first part 232b and second part 234b of planet carrier 114b in response to a right hand drilling rotation direction and separates them in response to a left handed drilling rotation direction. An internal geared wheel 116b of first planetary transmission stage 104b is permanently connected to a hand-held tool housing, torsionally fixed.

Figure 17:
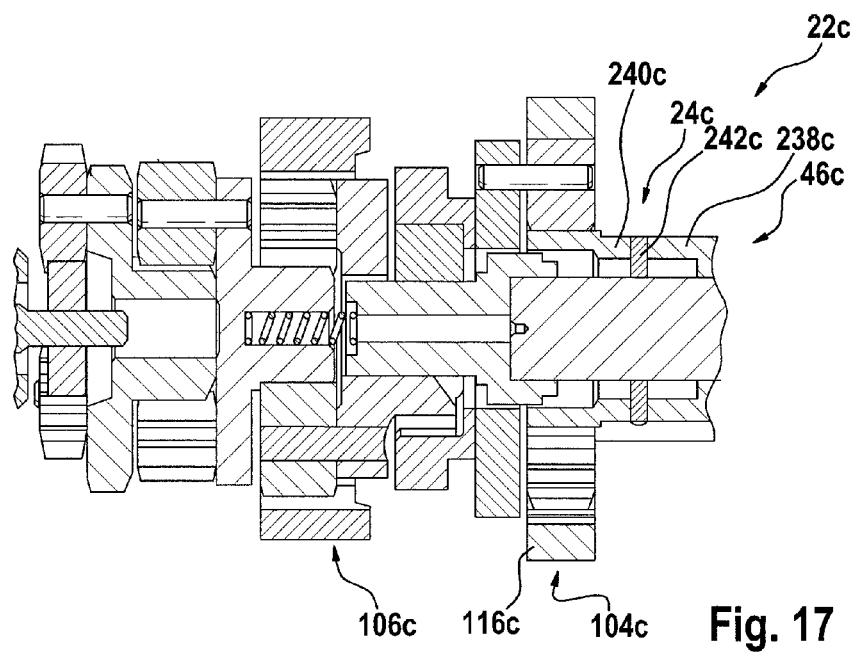
FIG. 17 shows an additional exemplary embodiment of a first striking mechanism shut-off device of a hand-held tool device according to the present invention.

FIG. 17 shows schematically a next exemplary embodiment of a first striking mechanism shut-off device 24c. A striking mechanism spindle 46c of a striking mechanism 22c is developed in two parts. A first part 238c of striking mechanism spindle 46c is connected to a striking mechanism drive device. A second part 240c of striking mechanism spindle 46c is connected to a second planetary transmission stage 106c. First striking mechanism shut-off device 24c has a freewheel 242c that appears meaningful to one skilled in the art, which connects first part 238c and second part 240c of striking mechanism spindle 46c torsionally fixed, in response to a right hand drilling rotation direction and separates them in response to a left handed drilling rotation direction. An internal geared wheel 116c of first planetary transmission stage 104c is permanently connected, torsionally fixed, to a hand-held tool housing.

Figure 18:
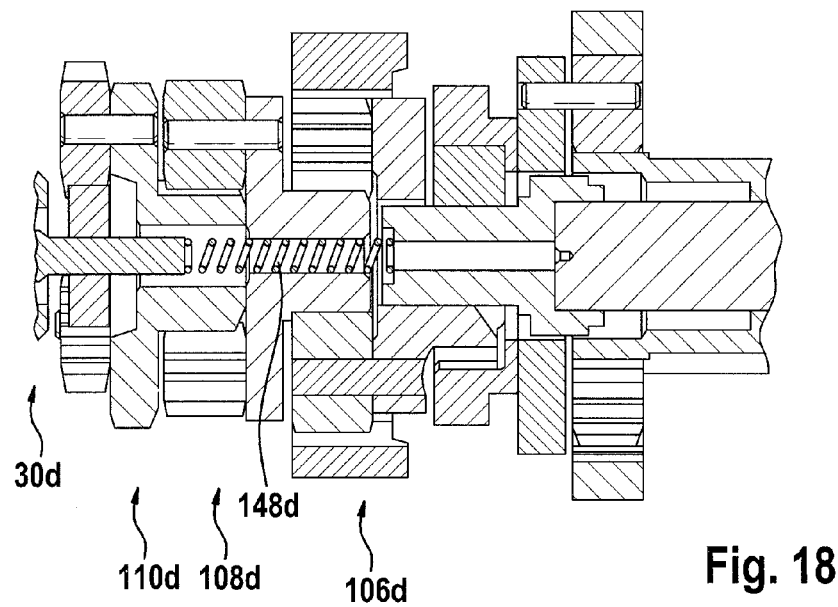
FIG. 18 shows an alternative exemplary embodiment of a striking mechanism switch spring of a hand-held tool device according to the present invention.

FIG. 18 shows a further exemplary embodiment of a striking mechanism switching spring 148d. A second planetary transmission stage 106d supports striking mechanism switching spring 148d on the side facing the tool chuck. A drive unit 30d supports striking mechanism switching spring 148d on the side facing away from the tool chuck. Second planetary transmission stage 106d, a third planetary transmission stage 108d and a fourth planetary transmission stage 110d enclose the striking mechanism switching spring 148d in each case in at least one plane, which is aligned perpendicular to an axial direction of planetary transmission stages 106d, 108d, 110d. Drive unit 30d is connected torsionally fixed to a part of planetary transmission stage 110d.

Figure 19:
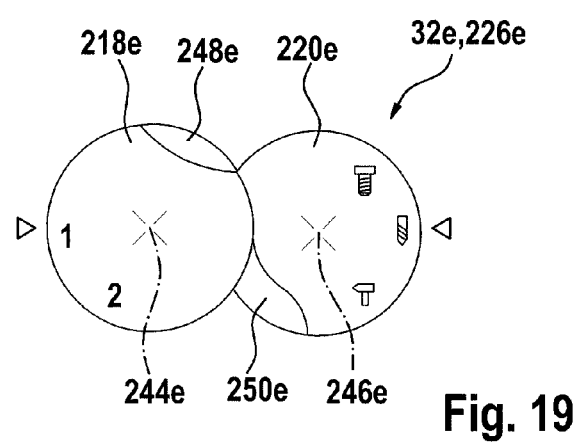
FIG. 19 shows an alternative exemplary embodiment of an operating device and a protective device of a hand-held tool device according to the present invention.

FIG. 19 shows an alternative exemplary embodiment of operating device 32e and a protective device 226e. Operating device 32e has a first operating element 218e and a second operating element 220e. Operating elements 218e, 220e are supported in a pivotable manner about rotational axes 244e, 246e. Operating elements 218e, 220e have a disk-shaped basic form. First operating element 218e, which is not shown in greater detail, is connected to a planetary transmission via a mechanism that appears meaningful to one skilled in the art. A first transmission and a second transmission are able to be set using first operating element 218e. Second operating element 220e, which is not shown in greater detail, is connected to a control element via a mechanism that appears meaningful to one skilled in the art. Using second operating element 220e, one is able to set the screw mode, the drilling mode and the percussion drilling mode. Moreover, one might be able to set a chisel mode.

Protective device 226e has a freewheeling region 248e bordered by first operating element 218e. Protective device 226e has a freewheeling region 250e bordered by second operating element 250e. Freewheeling region 248e of first operating element 218e enables the setting of the screw mode, the drilling mode and the percussion drilling operation when a second transmission has been set. Freewheeling region 250e of second operating element 220e enables the setting of the screw mode and the drilling mode when a second transmission has been set. In the percussion drilling operation, protective device 226e prevents setting the first transmission. When the first transmission has been set, protective device 226e prevents setting the percussion drilling operation.

What is claimed is:

1. A hand-held tool device, comprising:
   a tool spindle including a striking surface which is oriented substantially perpendicularly relative to an axial direction of the tool spindle;
   a striking mechanism configured to transfer rotational motion into a translatory striking motion, the striking mechanism including a striker which is configured to transfer the translatory striking motion to the striking surface of the tool spindle; and
   a planetary transmission having (i) at least one first planetary transmission stage which drives the striking mechanism, (ii) a second planetary transmission stage which drives at least the tool spindle, and (iii) a striking mechanism shut-off clutch,
   wherein the striking mechanism shut-off clutch is situated between the first planetary transmission stage and the second planetary transmission stage,
   wherein the tool spindle is configured to transfer an axial clutching force in at least one operating state to the striking mechanism shut-off clutch which at least one of opens the striking mechanism shut-off clutch or closes the striking mechanism shut-off clutch.

2. The hand-held tool device as recited in claim 1, wherein the second planetary transmission stage drives the first planetary transmission stage in at least one operating state.

3. The hand-held tool device as recited in claim 1, wherein the striking mechanism shut-off clutch has a clutch element which is supported in an axially displaceable manner.

4. The hand-held tool device as recited in claim 1 wherein the striking mechanism shut-off clutch has a clutch element which is connected torsionally fixed to a planet carrier of the first planetary transmission stage.

5. The hand-held tool device as recited in claim 1, wherein the striking mechanism shut-off clutch has a clutch element which is connected torsionally fixed to a planet carrier of the second planetary transmission stage.

6. The hand-held tool device as recited in claim 5, wherein the planet carrier of the second planetary transmission stage is configured in at least two parts.

7. The hand-held tool device as recited in claim 5, wherein the planet carrier of the second planetary transmission stage is connected torsionally fixed to the tool spindle.

8. The hand-held tool device as recited in claim 1, wherein the first planetary transmission stage is provided to increase a rotational speed of the second planetary transmission stage so as to drive the striking mechanism.

9. The hand-held tool device as recited in claim 8, wherein the planetary transmission supports the tool spindle in a rotatable manner.

\* \* \* \* \*